Sept. 28, 1943.  J. E. SAUNDERS  2,330,451
DUAL THRESHING CYLINDER
Filed Jan. 30, 1942   2 Sheets-Sheet 1
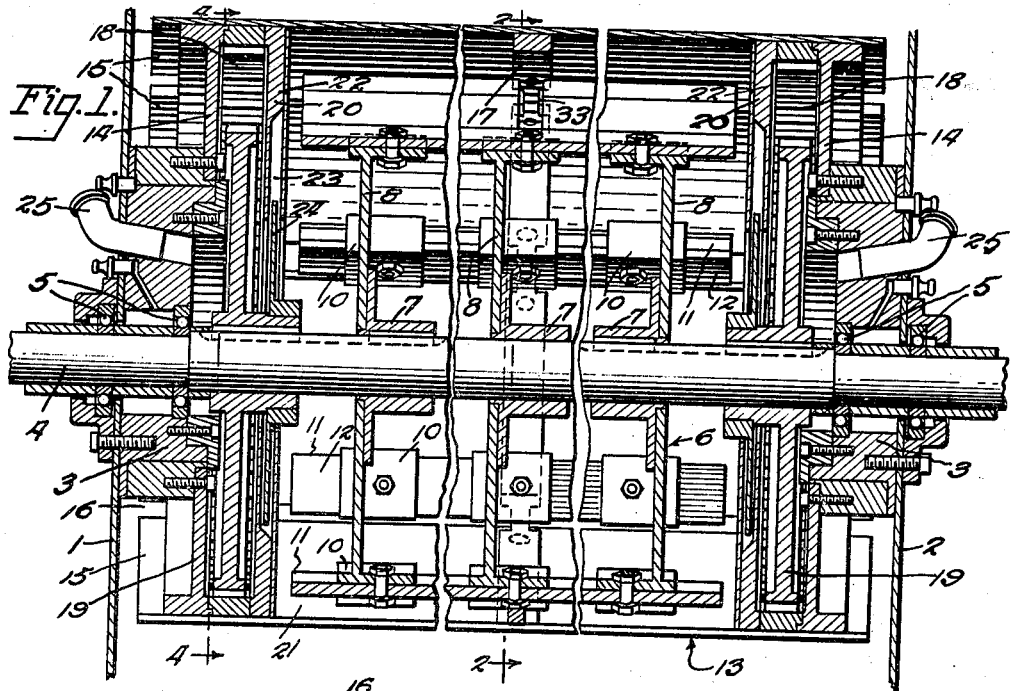
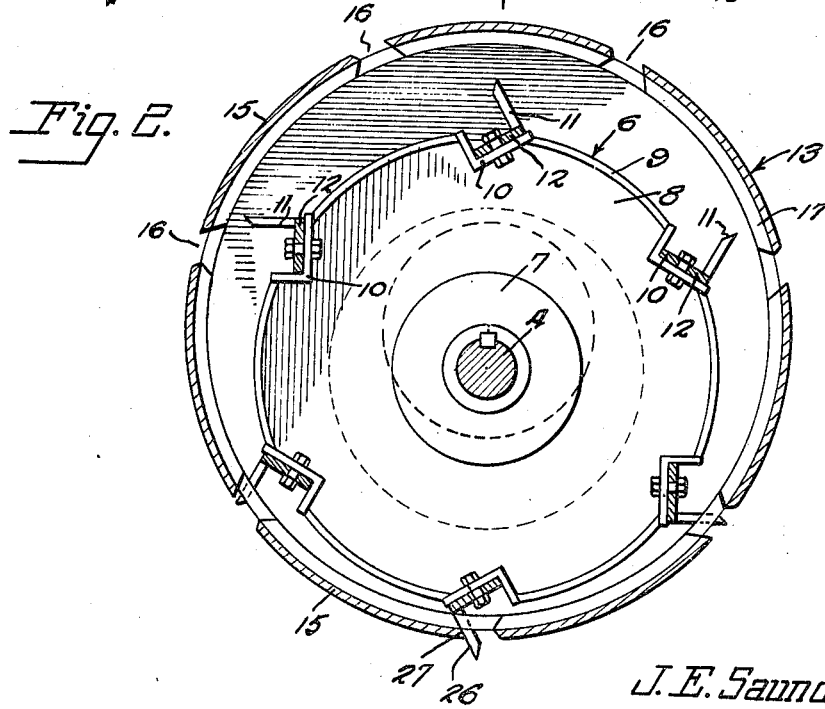
Inventor
J. E. Saunders
By Mason Fenwick & Lawrence
Attorneys Sept. 28, 1943.  J. E. SAUNDERS  2,330,451
DUAL THRESHING CYLINDER
Filed Jan. 30, 1942  2 Sheets-Sheet 2
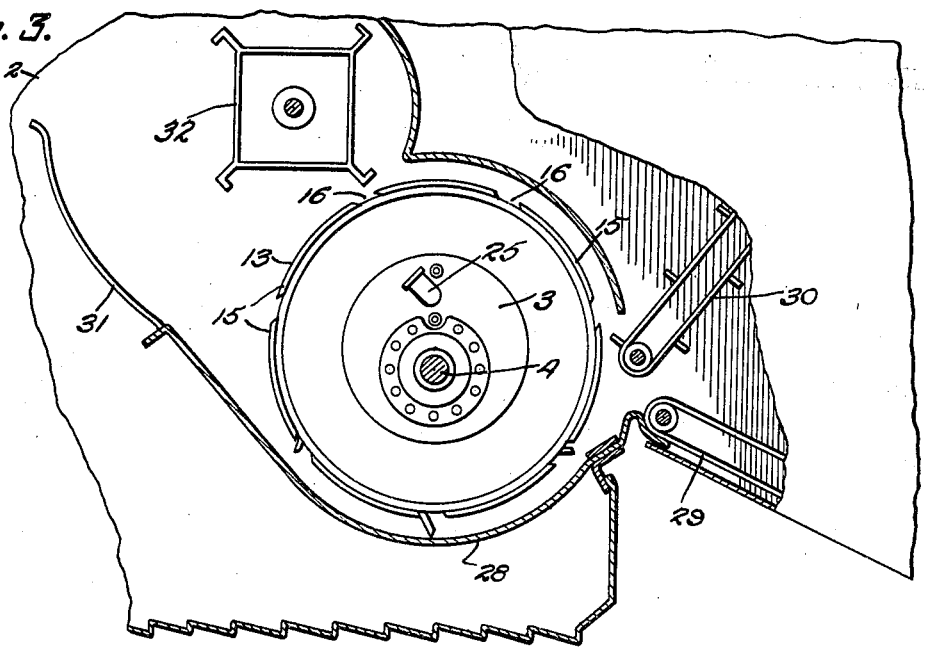
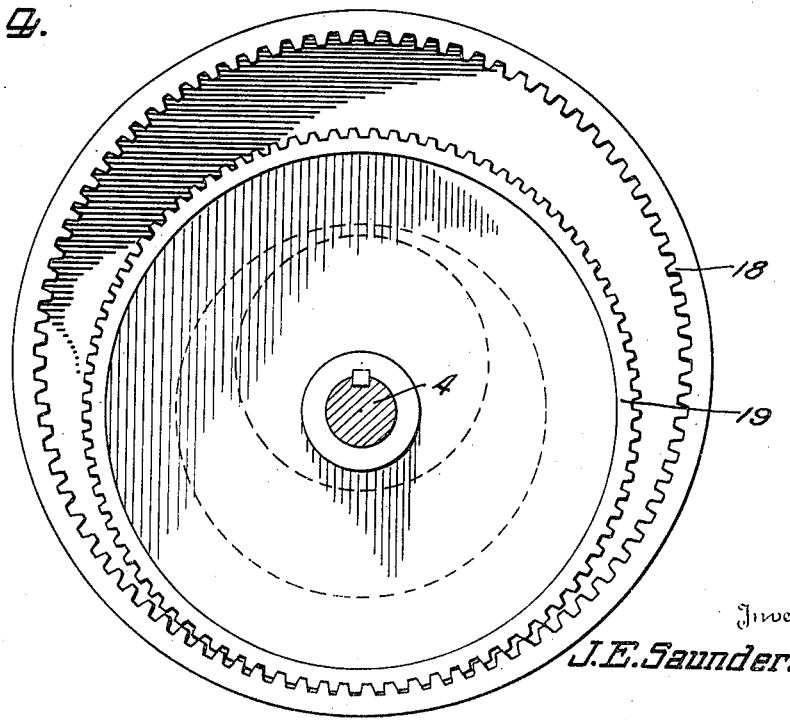
Inventor
J. E. Saunders Patented Sept. 28, 1943

2,330,451

UNITED STATES PATENT OFFICE 2,330,451

DUAL THRESHING CYLINDER

James E. Saunders, Sidon, Miss.

Application January 30, 1942, Serial No. 428,951

8 Claims. (Cl. 130—27)

This invention relates to threshing machines of the cylinder type, and proposes a dual threshing cylinder as a substitute for the single cylinder commonly employed in combines and other threshing machines.

One of the objects of the invention is to provide a dual threshing cylinder including an outer cylinder or cleaning drum of generally smooth exterior contour, in operative proximity to the concave, having longitudinal slots thereacross at uniform circumferential intervals, and an inner cylinder having longitudinal threshing bars at equal circumferential intervals, said cylinders being intergeared, driven from a common power shaft and so eccentrically mounted that the threshing bars project through the slots in the cleaning cylinder in that phase of the path of rotation of said cylinders which is adjacent the concave, but are withdrawn within the circumference of the cleaning drum throughout the complementary phase of said path of rotation. The smooth contour of the outer cylinder or drum compacts the cut grain in the concave without the risk of wrapping, while the relative narrowness of the slots through which the threshing bars project prevent trash and excess litter getting into the drum.

Another object of the invention is to provide a dual threshing cylinder of the character described, in which the inner and outer cylinders travel at different speed ratios whereby the threshing bars move across the width of the slots through which they project, the leading sides of said bars coming into close adjacency with the trailing edges of the cleaning plates of the outer cylinder or drum, by the time they reach their phase of greatest projection, so that they are scraped clean of adherent matter as they withdraw, not only keeping the bars clean and the slots unclogged, but also preventing the drawing of straw etc. into the cleaning drum.

A further object of the invention is the provision of a dual threshing cylinder, as described, in which the smooth outer surface of the cleaning drum permits the threshing cylinder to be operated at slow speeds without wrapping, which in ordinary single cylinders is only prevented by centrifugal force engendered through rapid rotation of the cylinder. The relatively slow operation of the threshing cylinder of the present invention greatly improves the quality of many kinds of seed and grain because of the reduced proportion of cracked or bruised grains.

Other objects of the invention will appear as the following description of a preferred and practical embodiment thereof proceeds.

In the drawings which accompany and form a part of the following specification, and throughout the several figures of which the same characters of reference have been employed to designate identical parts:

Figure 1 is a longitudinal vertical section through a dual threshing cylinder embodying the principles of the invention;

Figure 2 is a diametrical cross-section taken along the line 2—2 of Figure 1;

Figure 3 is a section through part of a combine, in which the subject dual threshing cylinder is employed.

Figure 4 is a diametrical section taken along the line 4—4 of Figure 1.

Referring now in detail to the several figures, the reference characters 1 and 2 represent the opposite fixed walls of a combine or other form of threshing machine, to which are secured the eccentric bearing blocks 3. These are so arranged that their direction of minimum throw is downward. The walls 1 and 2 and the bearing blocks 3 are apertured for the passage of the drive shaft 4 which is journaled in ballbearings 5. A threshing bar cylinder which as a whole is designated by the reference character 6, is directly keyed to the drive shaft 4. Said cylinder, as shown, is of skeleton construction comprising a plurality of spaced hubs 7 carrying disks or spiders 8, the outer ends of said spiders having the cylindrical flanges 9. Said cylindrical flanges have the indented angular seats 10, the indented seats of the several flanges being in the same phase and receiving the longitudinal threshing bars 11, each of which has a base flange 12 bolted to the angular seats 10. Figure 1 shows that the two end hubs 7 of the threshing bar cylinder are keyed to the drive shaft.

An outer cylinder or cleaning drum 13 surrounds the threshing bar cylinder. The cleaning drum comprises opposite end plates 14 journaled on the eccentric bearing blocks 3. Said cleaning drum includes also the cleaning plates 15, which are of smooth cylindrical curvature, of considerable width, and spaced about the end plates 14 at equal intervals with the slots 16 intervening.

If the cleaning drum is long, there may be intervening supporting rings for the cleaning plates 15, one of which is shown at 17 in Figure 1.

The cleaning drum 13 is driven by means of internal ring gears 18, one on each side suitably secured to the end plates 14 and meshing in their lower arcs with the wheel gears 19, the latter being keyed to the drive shaft 4. The meshing ring and wheel gears preferably run in a body of grease, a suitable gear chamber being defined between the end plate 14 and a partition 20, the latter separating the gears from the drum chamber 21 within which the threshing bar cylinder revolves. Said partition comprises an outer annular member 22 having an annular slot 23 opening in its inner circumference and receiving a circular flange 24 which rotates with the wheel gear 19 and through its centrifugal action forms a barrier for the escape of grease, in a manner well known. The grease tubes 25 communicate with the respective gear chambers and afford means for replenishing the grease therein.

By having the drive between the cleaning drum and threshing bar cylinder at both ends, the drum runs with a minimum of torque and at the exact ratio of speed to match the revolutions of the threshing bar cylinder.

While it is feasible to have the cleaning drum and the threshing bar cylinder travel at the same speed, an advantage is obtained by having them differently geared with the threshing bar cylinder traveling faster, in that there is a translatory movement of the threshing bars across the width of the slots 16 which not only keeps the slots clear, but also causes the leading sides 26 of the threshing bars 11 to assume a position in substantial engagement with the trailing edges 27 of the cleaning bars 15 at about the time the cleaning bars reach their phase of maximum projection, as indicated in Figure 2, so that as the cleaning bars withdraw they are scraped clear of any adherent matter by the cleaning bars, being thus maintained at their maximum threshing efficiency.

In the illustrated embodiment of the invention, the gear ratio is 6 to 7, the threshing bar cylinder revolving seven times to six revolutions of the cleaning drum. This requires the provision of one more slot in the cleaning drum than the number of threshing bars on the threshing bar cylinder. Any other gear ratio may be employed without deviating from the principles of the invention.

Figure 3 shows the dual threshing cylinder 6 in operative proximity to the concave 28. Cut grain from the harvesting unit of the combine is brought to the concave by means such as the belt conveyor 29, the grain being delivered from the conveyor by the spiked belt 30. The smooth cylindrical contour of the cleaning drum 13 causes the cut grain to be uniformly compacted in the space between the cleaning drum and the concave. The threshing bars 11 begin to protrude at the anterior end of the concave and reach their maximum protrusion which represents their maximum threshing pressure against the grain in the intermediate part of the concave, after which they are progressively withdrawn. By virtue of the fact that the threshing bar cylinder is entirely enclosed within the cleaning drum with the exception of the threshing bars in the region of their protrusion, centrifugal force is not relied upon to keep the straw from wrapping about the threshing bar cylinder as in ordinary single cylinder threshing machines. In view of the smooth contour of the cleaning drum there is no risk of wrapping. Therefore, the threshing cylinder can be run at a much slower speed than is practicable with single cylinder threshers, which greatly improves the quality of many kinds of seeds, because of the reduced number of cracked or bruised grains. The smooth character of the outer surface of the cleaning drum causes the threshed grain and straw to be thrown off onto the straw rack or grate 31, the straw being engaged by the straw cutoff cylinder 32 and removed from the proximity of the dual threshing cylinder.

Inasmuch as the bars 11 revolve more rapidly than the plates, they continuously pass the slots 16 and prevent any excess litter from accumulating inside the drum.

Referring to Figure 1, it will be observed that the supporting ring 17 is reduced in width to a narrow bridge 33 where it intersects the slots 16, and that the threshing bars 11 have depthwise slots straddling the bridges so as to provide clearance for the threshing bars in the region of their protrusion. The narrowness of the supporting ring at said points of intersection reduce the dead spots of the threshing bars.

While I have in the above description disclosed what I believe to be a preferred and practical embodiment of the invention, it will be understood to those skilled in the art that the details of construction and the arrangement of parts as shown and described, are by way of example and not to be construed as limiting the scope of the invention which is defined in the appended claims.

What I claim as my invention is:

1. Dual threshing cylinder comprising synchronously driven members, one being a hollow drum including end plates, longitudinal cleaning plates forming the periphery of said drum secured to said end plates, having a smooth cylindrical exterior contour and spaced to form longitudinal slots evenly spaced about said drum, an intermediate supporting ring within said drum having its outer periphery contacting said cleaning plates and being formed with relatively narrow portions intersecting said slots, the other member being a threshing bar cylinder within said drum having peripheral threshing bars parallel to said slots, said threshing bar cylinder being so eccentrically mounted and driven in such phase with respect to said drum as to cause said bars to project through said slots through a substantial arc of the circumference of said drum, said threshing bars being formed with notches affording clearance for the relatively narrow portions of said supporting ring.

2. Dual threshing cylinder comprising synchronously driven members, one being a hollow drum having an exterior cylindrical surface with longitudinal slots at equal circumferential intervals communicating with the interior of said drum, and the other being a threshing bar cylinder within said drum comprising a plurality of axially spaced spiders each having angularly indented seats in the same phase, and peripheral threshing bars of angular cross-section, each bar having a flange cooperating with the corresponding angular seats of said spiders and secured thereto, and a portion projectable through said slots, said threshing bar cylinder being so eccentrically mounted, and driven in such phase with respect to said drum as to cause said portions of said bars to project through said slots through a substantial arc of the circumference of said cleaning drum.

3. Dual threshing cylinder comprising a hollow drum having an exterior cylindrical surface with longitudinal slots at equal circumferential intervals communicating with the interior of said drum, a drive shaft passing through said drum on an axis below the axis of said drum, a threshing bar cylinder within said drum fixed to said drive shaft, said threshing bar cylinder having peripheral threshing bars parallel to said slots gearing between said threshing bar cylinder and said drum for driving the latter in the same direction as said threshing bar cylinder, said threshing bar cylinder being so eccentrically mounted and positioned in such phase with respect to said drum as to cause said bars to project through said slots through a substantial arc of the circumference of said drum.

4. Dual threshing cylinder comprising a hollow drum including longitudinal cleaning plates forming the periphery of said drum having a smooth cylindrical exterior contour and spaced to form longitudinal slots evenly spaced about said drum, a drive shaft passing through said drum on an axis below the axis of said drum, a threshing bar cylinder within said drum fixed to said drive shaft having peripheral threshing bars parallel to said slots, gearing between said threshing bar cylinder and said drum for driving the latter in the same direction as said threshing bar cylinder, the latter being so eccentrically mounted and driven in such phase with respect to said drum as to cause said bars to project through said slots through a substantial arc of the circumference of said drum, the ratio of said gearing being such as to drive said threshing bar cylinder at a faster speed than said drum whereby said bars are translated across the width of said slots and into substantial contact with said cleaning plate during the period of their withdrawal from said slots.

5. Dual threshing cylinder construction comprising spaced supports, bearing blocks mounted on said supports in horizontal axial alignment, a cleaning drum having end plates journaled on said bearing blocks and having longitudinal cleaning plates secured to said end plates forming the periphery of said drum, said cleaning plates having smooth cylindrical external surfaces spaced to form longitudinal slots evenly spaced about said drum, a drive shaft extending between said supports axially parallel to and below the axis of said bearing blocks, a threshing bar cylinder within said drum fixed to said drive shaft and having peripheral threshing bars parallel to said slots, an internal gear at one end at least of said drum, a gear on said drive shaft meshing with said internal gear, said threshing bar cylinder being so eccentrically mounted and driven in such phase with respect to said threshing bar cylinder as to cause said bars to project through said slots through a substantial arc of the circumference of said drum.

6. Dual threshing cylinder construction as claimed in claim 5, the ratio of said meshing gears being such that the threshing bar cylinder is driven at the faster rate whereby said threshing bars travel widthwise across said slots and into substantial engagement with the adjacent cleaning plates during the period of protrusion and withdrawal of said bars with respect to said slots whereby said bars are scraped clean.

7. Dual threshing cylinder construction as claimed in claim 5, including a partition between said gearing and said threshing bar cylinder defining with the adjacent end plate a gear chamber, and means for supplying grease to said gear chamber.

8. In a threshing machine, means forming a concave and a driven threshing cylinder in operative proximity to said concave having a smooth cylindrical surface intersected by longitudinal slots, and threshing bars protrudable and withdrawable through said slots in that phase of rotation of said threshing cylinder which is adjacent said concave, said threshing bars being translatable widthwise of said slots and withdrawable while in positions substantially contiguous to one of the walls of said slots whereby they are scraped clean.

JAMES E. SAUNDERS.